(12) United States Patent
Mathieu

(10) Patent No.: US 6,513,205 B1
(45) Date of Patent: Feb. 4, 2003

(54) MULTI-PRODUCT HOLDING AND RETAINING SYSTEM

(75) Inventor: David L. Mathieu, Colchester, CT (US)

(73) Assignee: Acme United Corporation, Fairfield, CT (US)

( * ) Notice: Subject to any disclaimer, the term of this patent is extended or adjusted under 35 U.S.C. 154(b) by 0 days.

(21) Appl. No.: 09/952,700

(22) Filed: Sep. 14, 2001

Related U.S. Application Data

(60) Provisional application No. 60/232,728, filed on Sep. 15, 2000.

(51) Int. Cl.$^7$ ............................................... A44B 21/00
(52) U.S. Cl. .............................. 24/458; 24/570; 24/563; 24/67.3; 24/67.9
(58) Field of Search .................. 24/458, 570, 67.3, 24/63.9, 67 P, 711.1, 707.9, 294, 295, 297, 563, 713.6; 411/508, 553; 403/408.1; 248/214, 450; 211/50, 51; 281/28, 21.1, 50.51; 402/80 P, 19

(56) References Cited

U.S. PATENT DOCUMENTS

| | | | | |
|---|---|---|---|---|
| 4,438,552 A | * | 3/1984 | Omata | 24/704.1 |
| 4,593,441 A | * | 6/1986 | Louis | 24/297 |
| 5,018,895 A | * | 5/1991 | Meier, Jr. | 402/4 |
| 5,848,456 A | * | 12/1998 | Sjoqvist | 24/618 |
| 6,076,990 A | * | 6/2000 | Jahn | 402/70 |
| 6,112,378 A | * | 9/2000 | Lee | 24/458 |
| 6,164,617 A | * | 12/2000 | Butterfield et al. | 248/690 |
| 6,209,178 B1 | * | 4/2001 | Wiese et al. | 24/458 |

* cited by examiner

Primary Examiner—Robert J. Sandy
(74) Attorney, Agent, or Firm—Melvin I. Stoltz

(57) ABSTRACT

An easily employed, highly efficient, multi-product holding and retaining member is achieved which engages the apertures of a plurality of blister package product bearing support cards, maintaining the plurality of independent cards in a secure, fully integrated compact configuration, preventing movement and unwanted damage during shipping. In addition the holding and retaining member enables a stock clerk to place the plurality of blister package product bearing support cards directly onto the elongated rod or hooks simultaneously in a single operation, enabling rapid transfer of the product for sale and distribution.

19 Claims, 9 Drawing Sheets

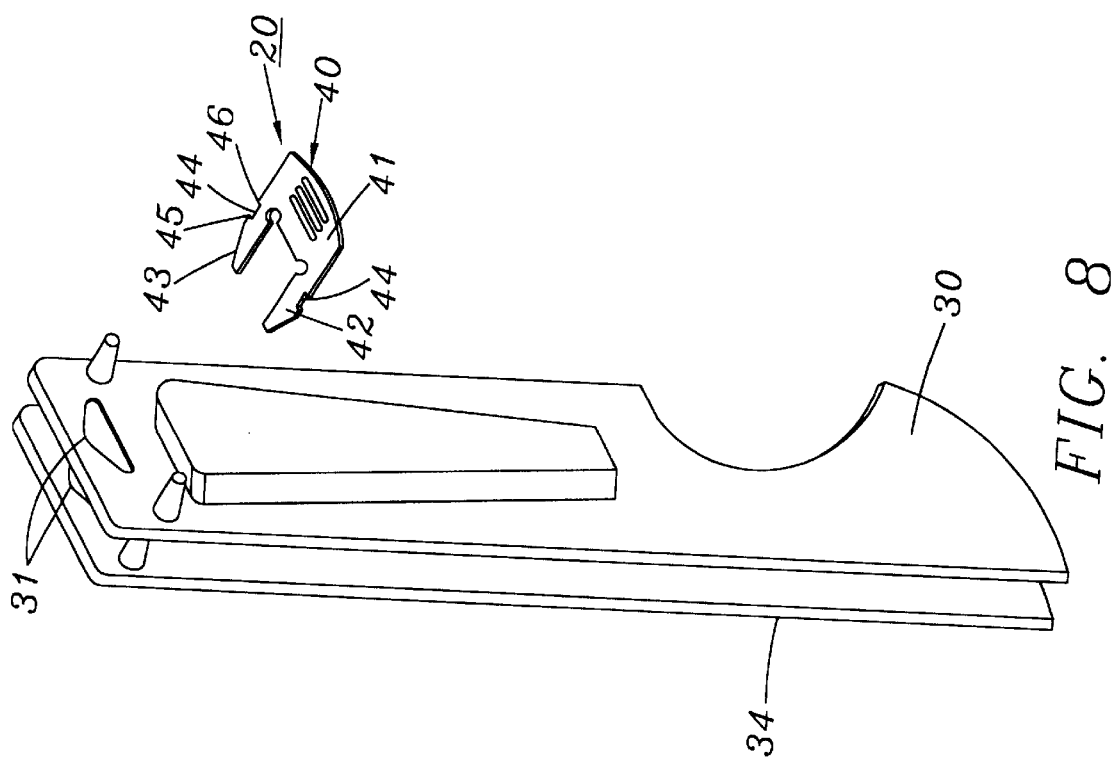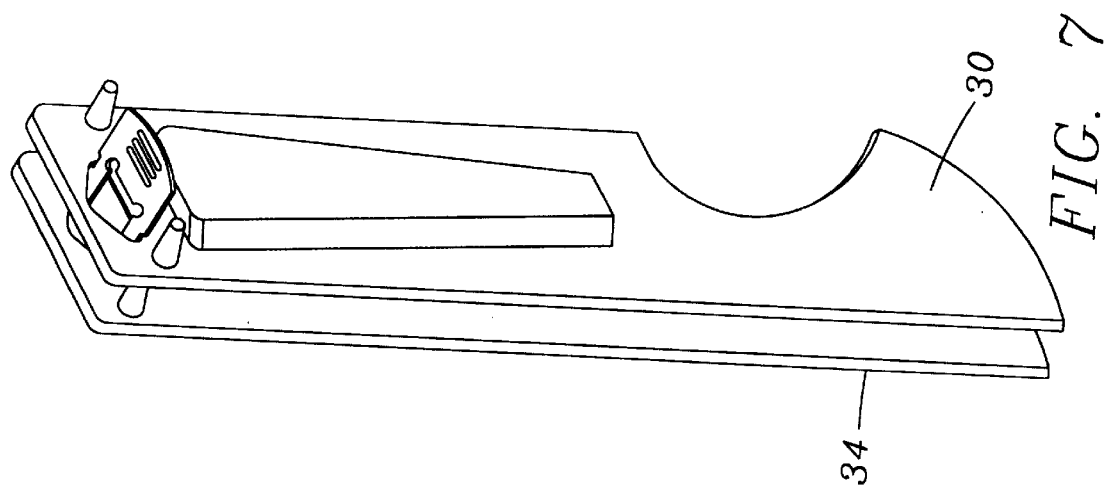

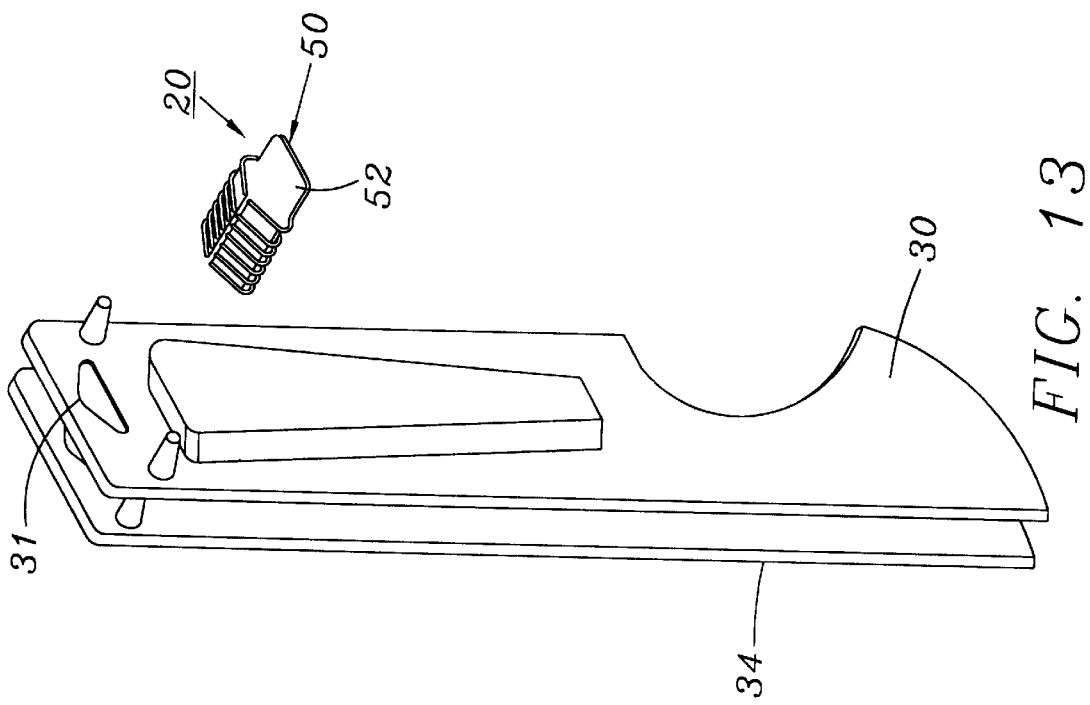
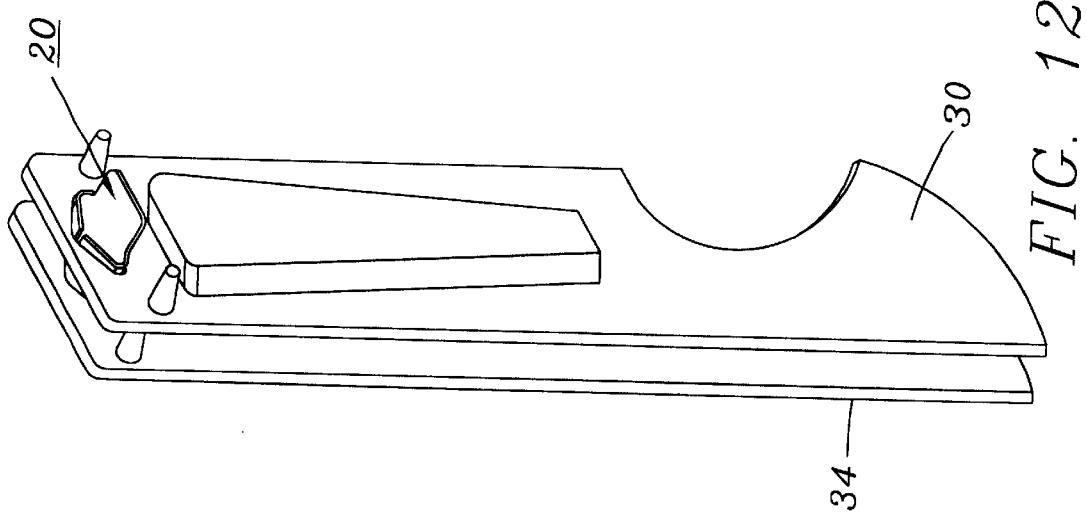

MULTI-PRODUCT HOLDING AND RETAINING SYSTEM

RELATED APPLICATIONS

This application is related to U.S. Provisional Pat. App. Ser. No. 60/232,728, filed Sep. 15, 2000 entitled Multi-Product Holding, Stacking and Display System.

TECHNICAL FIELD

This invention relates to product-bearing display card holding systems and, more particularly, to such holding systems which securely maintain the display cards in a stacked array for shipment and for loading on support hooks.

BACKGROUND ART

Substantial effort has been expended in developing various systems for assisting in the placement and positioning of products on store shelves as well as on display hooks or rods. In particular, one area which has continuously caused a substantial labor-intensive task is in the removal of blister packaged products from shipping cartons and the placement of these products on display hooks for sale.

In general, many retail outlets employ numerous elongated hooks or support rods which retain blister packaged products for display and sale. Typically, the particular product is retained in a blister housing, with both securely affixed to a support card. In addition, the support cards are formed with an aperture incorporated therein, directly adjacent the top edge of the card.

In order to provide a supply of the products in position for ease of distribution to the consumer, the products and cards are placed on the elongated rods or hooks by placing the support card on the hook or rod through the aperture thereof. In this way, the desired supply of product is retained and displayed.

Although the use of elongated support rods is extremely common and blister packaged products are commonly sold and distributed in this manner, the placement of the support card on the elongated rod is a labor-intensive task. In this regard, a supply clerk is required to manually position the terminating distal end of the elongated rod through the aperture of the support card and then push the support card along the length of rod towards its proximal end. Then, the process is repeated with each of the numerous additional cards to be placed thereon. Although this labor-intensive task has produced a long felt need in the industry for a more efficient product stocking system, no prior art method has been created which satisfies the current needs.

Therefore, it is a principal object of the present invention to provide a holding system for retaining a plurality of product bearing cards in a uniform stacked array and enabling the placement of the entire stacked array of cards on the hook or rod quicky and easily.

Another object of the present invention is to provide a holding system having the characteristic features described above which is quickly mounted in the aperture of the display cards and easily removed therefrom when desired.

Another object of the present invention is to provide a holding system having the characteristic features described above which securely holds the array of cards during shipment to prevent damage from unwanted shifting or movement.

Another object of the present invention is to provide a holding system having the characteristic features described above which securely maintains any desired number of cards in secure engagement.

Other and more specific objects will in part be obvious and will in part appear hereinafter.

SUMMARY OF THE INVENTION

By employing the present invention, all of the difficulties and drawbacks found in the prior art systems have been overcome, and an easily employed, highly efficient, multi-product holding and retaining member has been realized. In accordance with the present invention, numerous separate and independent blister package, product bearing support cards are quickly and easily placed on elongated support rods for selection by the consumer.

In the present invention, the previously unresolved difficulties have been overcome by achieving a product retaining and holding member which is engaged in the aperture of a plurality of blister package product bearing support cards. In this way, a plurality of independent cards are maintained in a secure, fully integrated compact configuration, preventing movement and unwanted damage during shipping.

In addition to substantially reducing or virtually eliminating damage during shipping, the holding member of the present invention is employed to enable a stocking clerk to place a plurality of blister package product bearing support cards directly onto the elongated rod simultaneously in a single operation. Then, by removing the multi-packaged holding and retaining clip member, the plurality of packages are maintained, independently supported on the elongated holding rod.

In the present invention, numerous alternate constructions for providing a multi-packaged holding and retaining clip member have been achieved. However, although various alternate embodiments have been developed and are fully disclosed herein, these alternate embodiments are provided as examples, demonstrating the various unique aspects and alternate constructions of the present invention.

In addition to providing a multi-package holding and retaining clip member for enabling a plurality of blister packaged products to be simultaneously placed on the holding and display rod, the present invention also teaches the optional use of at least one longitudinally extending alignment finger integrally formed on the support card and constructed for engaging and cooperating with the alignment finger of the adjacent card member. In this way, precise positioning of the numerous blister package product bearing support cards is provided for transportation as well as for retail display.

The invention accordingly comprises an article of manufacture possessing the features, properties, the relation of elements which will be exemplified in the articles hereinafter described, and the scope of the invention will be indicated in the claims.

THE DRAWINGS

For a fuller understanding of the nature and objects of the invention, reference should be had to the following detailed description taken in connection with the accompanying drawings, in which:

FIG. 7 is a perspective view depicting a plurality of blister package/product support cards with an alternate embodiment of the retaining clip member of the present invention interconnected therewith;

FIG. 8 is an exploded perspective view of the assembly of FIG. 7;

FIG. 12 is a perspective view depicting a plurality of blister package/product support cards with a further alternate embodiment of the retaining clip member of the present invention interconnected therewith;

FIG. 13 is an exploded perspective view of the assembly of FIG. 12;

DETAILED DISCLOSURE

Figure 1:
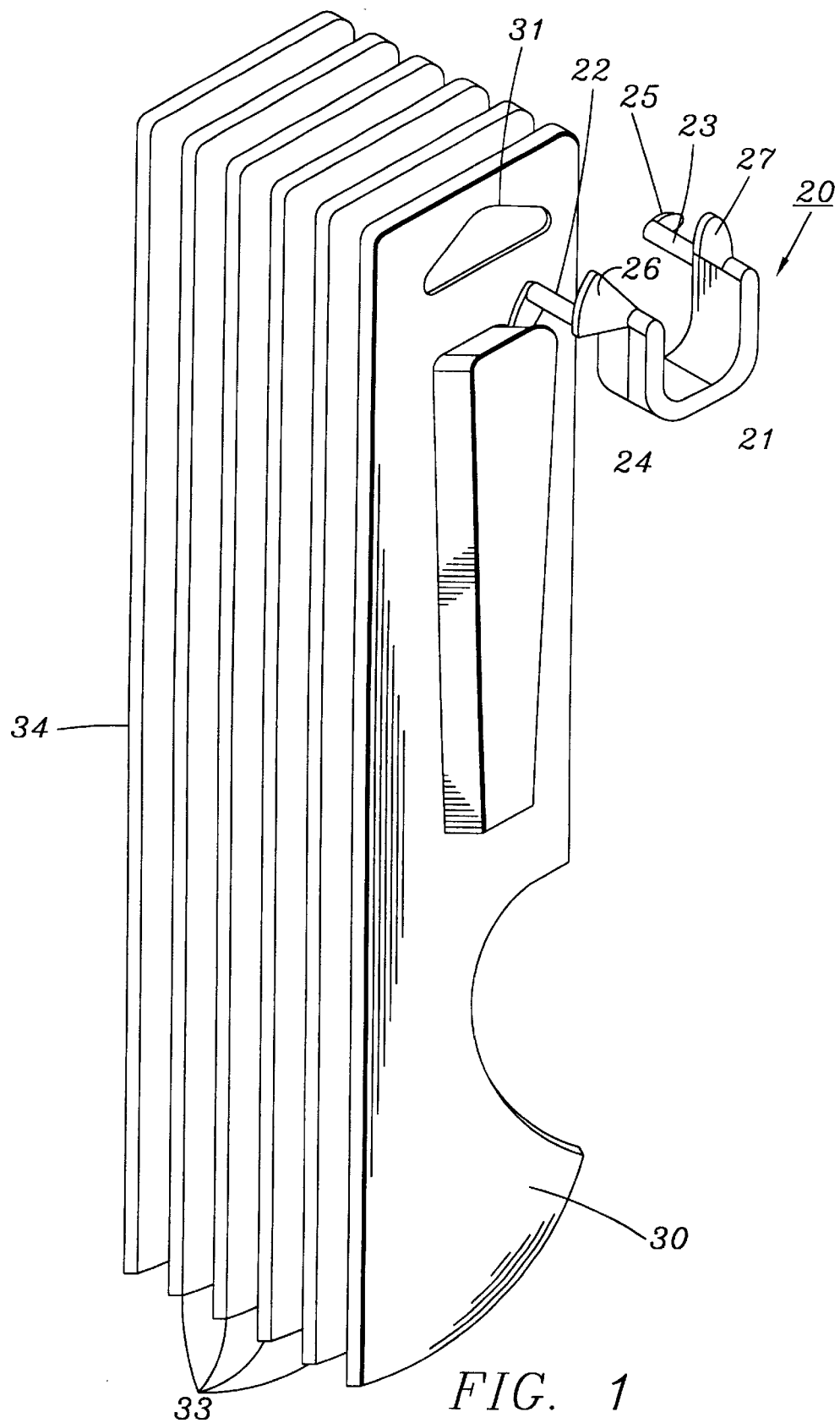
FIG. 1 is an exploded perspective view depicting a plurality of blister package/product support cards with one embodiment of the retaining clip member of the present invention associated therewith.
Figure 3:
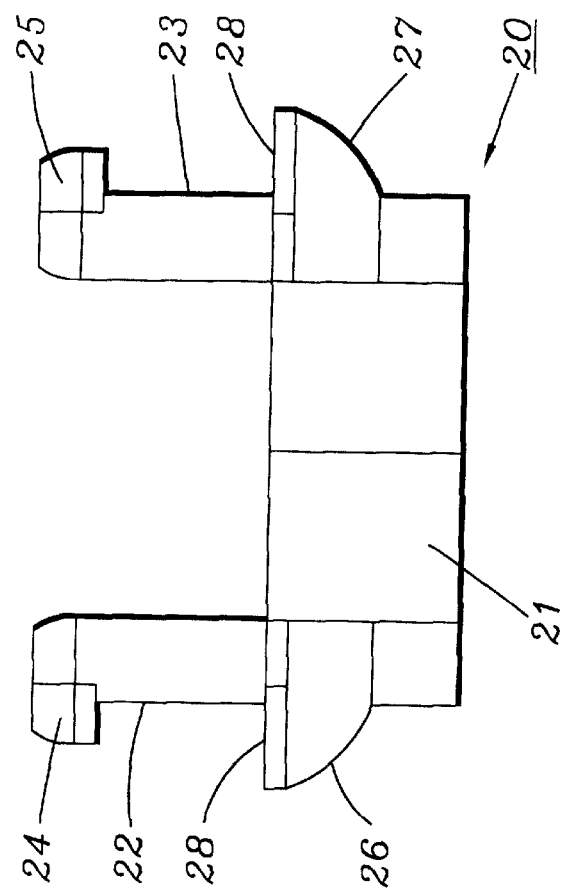
FIG. 3 is a top plan view of the retaining clip member of the FIG. 1.
Figure 2:
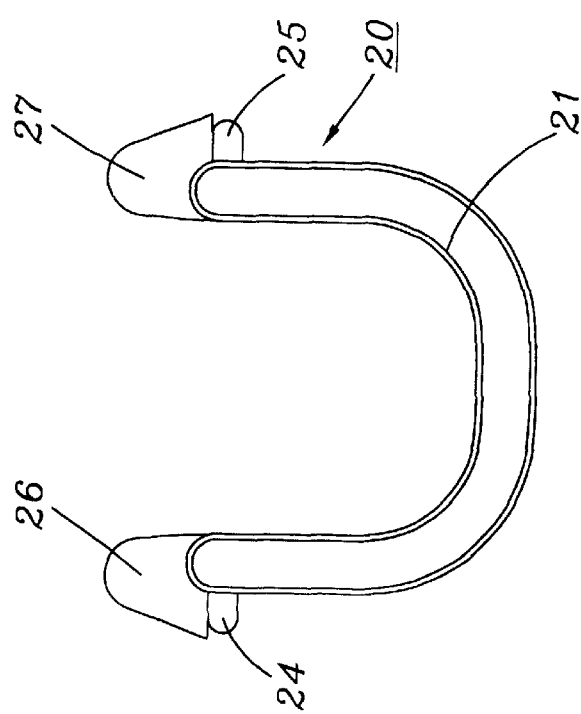
FIG. 2 is a front elevation view of the retaining clip member of FIG. 1.
Figure 5:
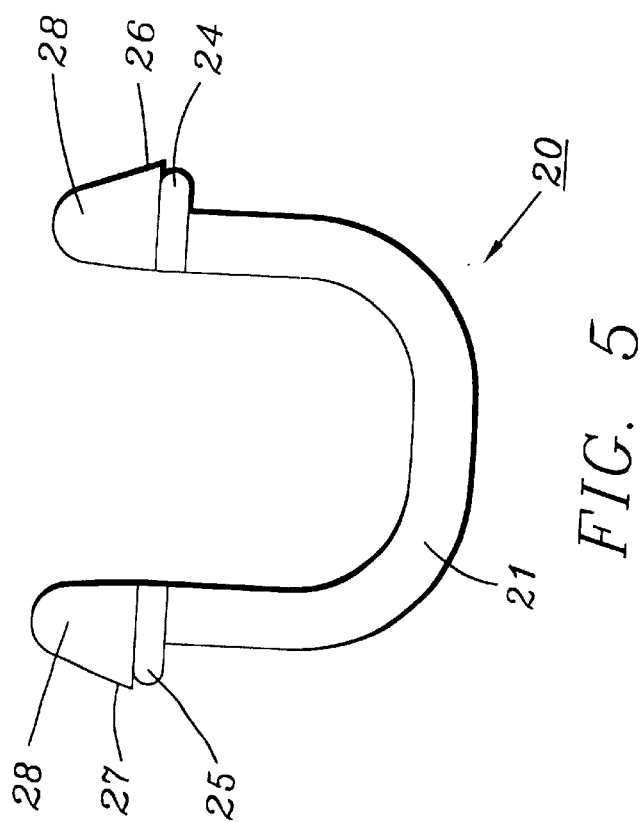
FIG. 5 is a front elevation view of the retaining clip member of FIG. 1 shown in its compressed or deflected position.
Figure 4:
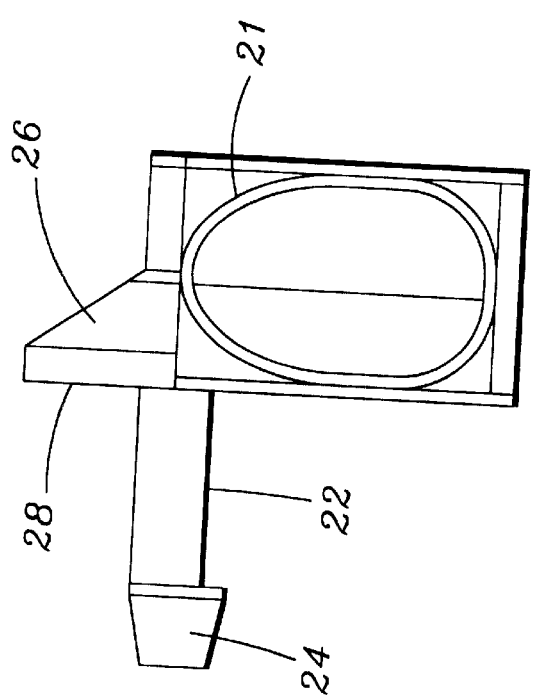
FIG. 4 is a side elevation view of the retaining clip member of FIG. 1.

By referring to FIGS. 1–20, along with a following detailed disclosure, the construction and operation of several alternate embodiments of the retaining clip member of the present invention can best be understood. Although three alternate embodiments of the clip member are fully detailed and disclosed herein, further alternate embodiments of the present invention can be made without departing from the scope of this invention. Consequently, it is to be understood that the alternate embodiments shown and described herein are provided as examples of the present invention and are not intended to limit the scope of the present invention.

In FIGS. 1–6, one preferred embodiment of retaining clip member 20 of the present invention is fully depicted. As shown in these drawings, this embodiment of retaining clip member 20 comprises a generally U-shaped body portion 21 with elongated finger members 22 and 23 extending from the terminating ends of U-shaped body portion 21. As fully depicted, finger members 22 and 23 extend substantially perpendicularly from the terminating side edges of body portion 21, establishing right angles therewith. In addition, abutment stop 24 extends from the terminating distal end of arm member 22, while abutment stop 25 extends from the terminating distal end of arm member 23.

Finally, as clearly depicted throughout FIGS. 1–6, retaining clip member 20 also incorporates plate members 26 and 27 mounted at the terminating ends of U-shaped body portion 21, at the juncture between body portion 21 and elongated arm members 22 and 23. As depicted, plate member 26 is mounted to U-shaped body portion 21 at the juncture with arm member 22, while plate member 27 is mounted to U-shaped body portion 21 at the juncture with arm member 23. In addition, plate members 26 and 27 both incorporate a substantially flat surface 28 formed thereon which is positioned in juxtaposed, spaced, facing relationship with abutment stops 24 and 25.

By employing this embodiment of the present invention, a highly efficient, easily employed retaining clip member 20 is established. By easily compressing U-shaped body portion 21 on the outside edges thereof, finger members 22 and 23 are forced to move towards each other and, once the compression forces release, finger members 22 and 23 return to their original positions. By employing this process, retaining clip member 20 is quickly and easily inserted into engagement with a plurality of blister package/product display cards.

As shown in FIG. 1, a plurality of blister package/product display cards 30, 33, and 34 are depicted in juxtaposed, spaced, aligned relationship with each other, in a conventional stacked array for placement on a supporting hook or display rod. In addition, each blister package/product display card 30, 33, and 34 incorporates an aperture 31 through which the desired support hook or display rod is passed for enabling blister package/display cards 30, 33, and 34 to be supporting and retaining thereon. By employing the present invention, the plurality of blister package/display cards 30, 33, and 34 are capable of being secured together for shipment and for being simultaneously placed on supporting hook or display rod in a single operation, with ease and simplicity.

In accordance with the present invention, this embodiment is quickly and easily employed by pressing the outside edges of U-shaped body portion 21 of clip member 20, causing arm members 22 and 23 to be moved towards each other. Then, while in this compressed state, retaining clip member 20 is telescopically inserted through the plurality of apertures 31 formed by the stacked array of the plurality of blister package/display cards 30. 33, and 34.

Figure 6:
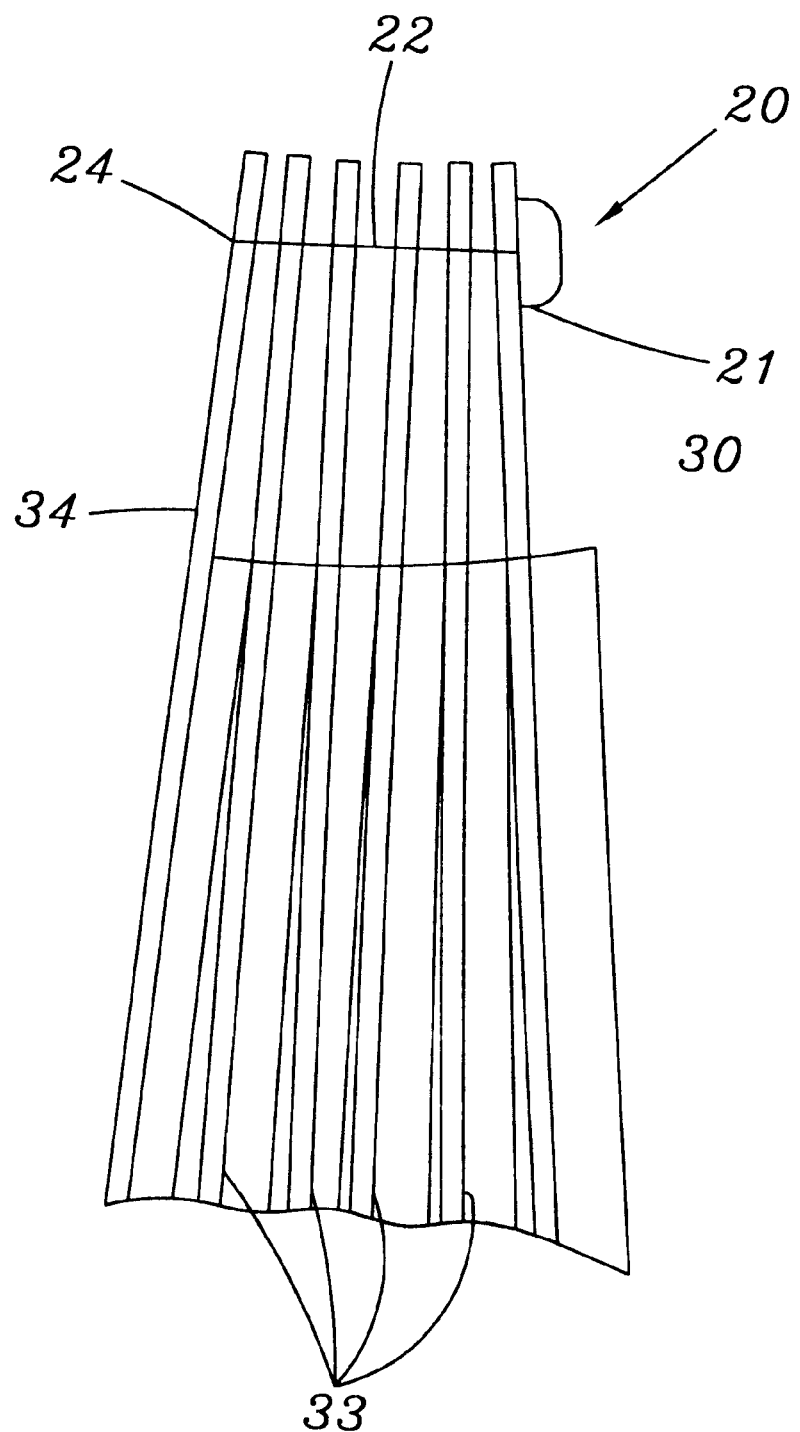
FIG. 6 is a side elevation view, partially broken away, depicting a plurality of blister package/product support cards secured in a stacked array with the retaining clip member of FIG. 1 mounted in place.
Figure 11:
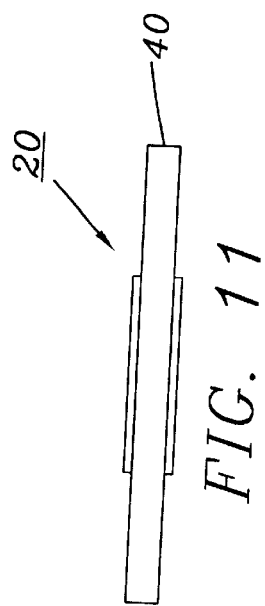
FIG. 11 is a front elevation view of the retaining clip member of FIG. 9.
Figure 9:
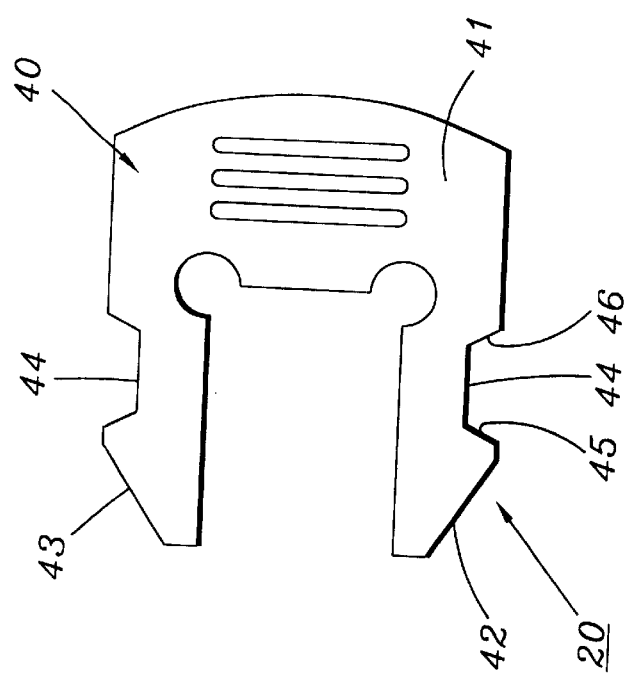
FIG. 9 is a top plan view depicting this alternate embodiment of the retaining clip member of the present invention.
Figure 10:
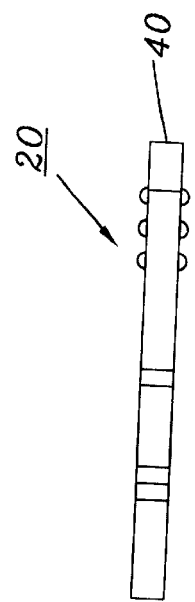
FIG. 10 is a side elevation view of the retaining clip member of FIG. 9.
Figure 16:
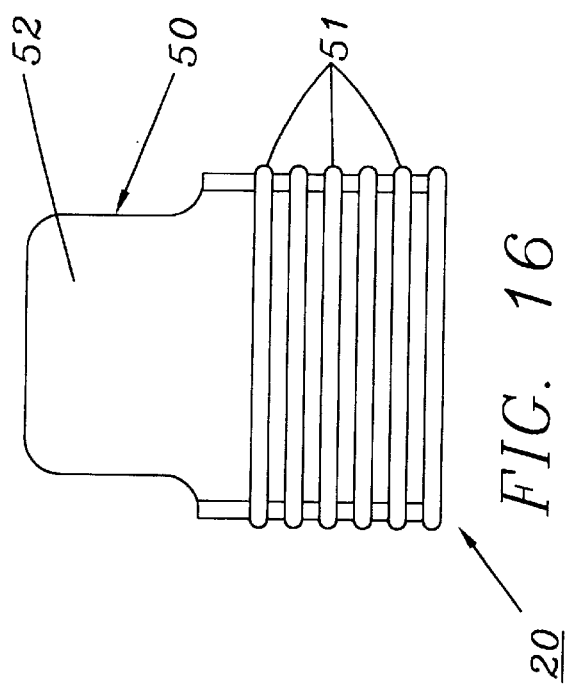
FIG. 16 is a bottom plan view of the retaining clip member of FIG. 14.
Figure 17:
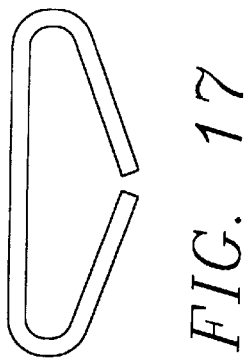
FIG. 17 is a rear elevation view of the retaining clip member of FIG. 14.
Figure 15:
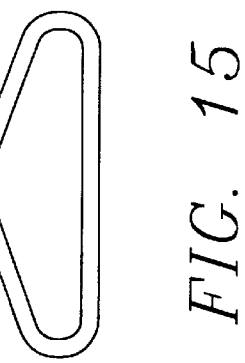
FIG. 15 is a front elevation view of the retaining clip member of FIG. 14.
Figure 14:
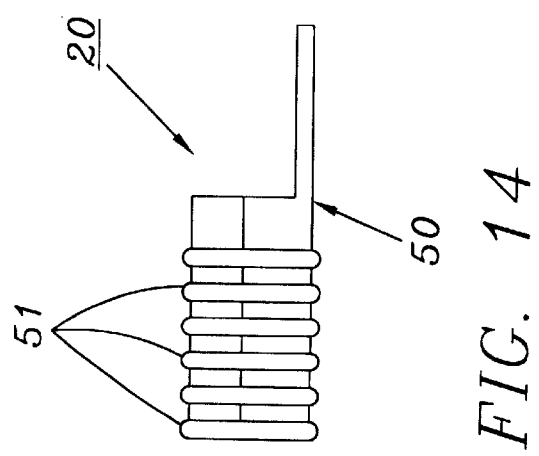
FIG. 14 is a side elevation view depicting this further alternate embodiment of the retaining clip member of the present invention.

As shown in FIG. 6, once arm members 22 and 23 have been inserted completely through the entire stacked array of blister package/display cards 30, 33, and 34, the compression force is removed, enabling U-shaped body portion 21 to return to its original position. This movement also causes arm members 22 and 23 to move outwardly, with abutment stops 24 and 25 engaging in the rearwardmost blister package/display cards 34, while surfaces 28 of plate members 26 and 27 engage the forwardmost or front blister package/display card 30.

In order to assure that the desired quantity of blister package/display cards 30, 33 and 34 are securely retained by clip member 20, arm members 22 and 23 are constructed with the required overall length for achieving the desired holding of the stacked array of cards 30. In addition, abutment stops 24 and 25 are constructed to extend beyond apertures 31 of rewardmost card 34, while flat surfaces 28 are constructed to extend beyond apertures 31 of the forward most display card 30. In this way, the entire stacked array of blister package/product display cards 30, 33, and 34 are securely retained by clip member 20, as desired.

In its preferred use, clip member 20 of the present invention is lockingly engaged with a plurality of blister package/product bearing display cards 30, 33, and 34 prior to shipment of cards 30, 33, and 34. In this way, display cards 30, 33, and 34 are securely held together as a single unit, virtually eliminating independent movement and possible damage. Furthermore, once display cards 30, 33, and 34 reach their final destination, they are quickly and easily removed as a group and placed on a card holding hook or rod for sale. Once display cards 30, 33, and 34 are mounted to the support rod or hook, clip member 20 is easily removed therefrom enabling each display to be individually removed, when desired.

In FIGS. 7–11, an alternate embodiment for retaining clip member 20 is fully detailed. In this embodiment, retaining clip member 20 comprises a substantially flat, U-shaped plate member 40 which comprises a central section 41 and two arm members 42 and 43 extending from central section 41. In the preferred embodiment, arm members 42 and 43 are interconnected with central section 41 in order to be flexible relative thereto.

In addition, in the preferred construction, each arm member 42 and 43 incorporates a notch 44 formed in the outer side edge thereof, the extent of which is defined by two, juxtaposed, spaced, facing wall portions 45 and 46. By forming each notch 44 with the precisely desired overall length, the precisely desired number of blister package/ product display cards 30 is easily retained by clip member 20.

In FIGS. 7 and 8, two juxtaposed, spaced, stacked blister package/ product display cards 30 and 34 are shown, with this embodiment of retaining clip member 20 being associated therewith. As depicted, the overall length of notch 44 in each arm member is constructed for precisely holding and securely engaging the two blister package/product display cards 30 and 34. However, any desired number of display cards may be secured using this embodiment of retaining clip member by merely constructing arm members 42 and 43 with the desired length, along with the required length for notch 44.

In order to provide the desired securement of blister package/product display cards 30 and 34 using this embodiment of retaining clip member 20, display cards 30 and 34 are aligned in a stacked array, as depicted, with aperture 31 of each display card 30 being aligned with each other. Then, retaining clip member 20 is inserted through apertures 31 by advancing finger members 42 and 43 through apertures 31 until fully engaged therewith, as depicted in FIG. 7.

Once in this position, wall portion 45 of each notch 44 engages the rearwardmost display card 34, while wall portion 46 of notch 44 engages forwardmost display card 30. With wall portions 44 in 45 in secure, locked engagement with the first card 30 and last display card 34, securement of the entire stacked array of display cards is achieved.

As is evident from the foregoing detailed discussion, arm members 42 and 43 are capable of flexing inwardly as plate member 40 of retaining clip member 20 is advanced through apertures 31, and then returned to its original position once plate member 40 is fully engaged with the plurality of blister package/product display cards 30, 34. In this way, secure, locked engagement of the stacked array of display cards 30, 34 is achieved quickly and easily. In addition, by controlling the length of arm members 42 and 43, any desired number of display cards can be securely held in place by clip member 20.

Furthermore, as detailed above, this embodiment of clip member 20 is also preferably employed prior to shipment of the product bearing display cards thereby preventing unwanted movement of the product and/or the display cards which might cause damage to the products. In addition, once the product bearing display cards reach their final destination, the group of cards, with clip member 20 secured therewith, are removed as a unit and mounted on the desired hook or rod. As a result, rapid and easy stacking of the product bearing cards is achieved and, once mounted, clip member 20 is removed to enable customers to individually select any desired product bearing display card.

In FIGS. 12–17, a further alternate embodiment of the present invention is depicted. In this embodiment, retaining clip member 20 comprises a substantially triangular shaped housing 50 which is constructed and dimensioned for cooperating interengagement with apertures 31 of blister package/product display cards 30, 34. In addition, housing 50 incorporates a forwardly extending panel 52 and a plurality of outwardly extending ridges 51 formed on the triangular shaped surface thereof.

In this embodiment, triangular shaped housing 50 of retaining clip member 20 is inserted through apertures 31 of display cards 30 and 34, with ridges 51 being constructed to cooperate with each apertures 31 by engaging the opposed surface of each display card 30 and 34 thereof. In this way, secure, locked engagement of each display card 30 is provided. In addition, as with the alternate embodiments detailed above, clip member 20 may comprise any desired length in order to securely retain any desired number of display cards. Furthermore, clip member 50 is also preferably used during shipment as well as to provide a rapid, easy holder for enabling the plurality of cards to be mounted on a hook or rod for sale.

Figure 20:
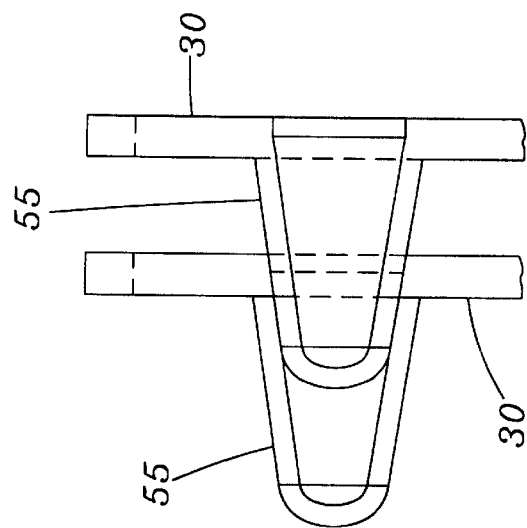
FIG. 20 is a greatly enlarged side elevation view depicting two co-operating finger members forming a part of the present invention.
Figure 19:
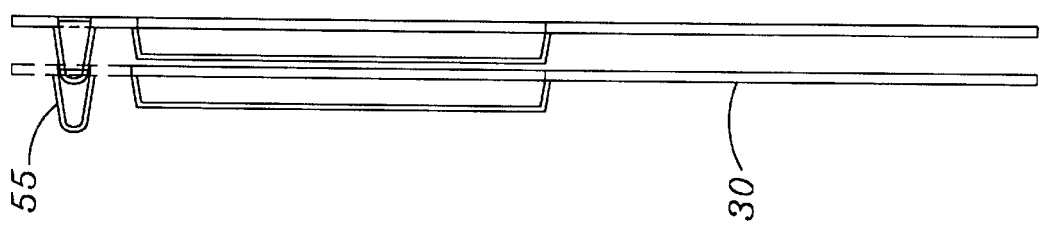
FIG. 19 is a side elevation view depicting two co-operating blister package/product support cards with alignment fingers mounted thereon.
Figure 18:
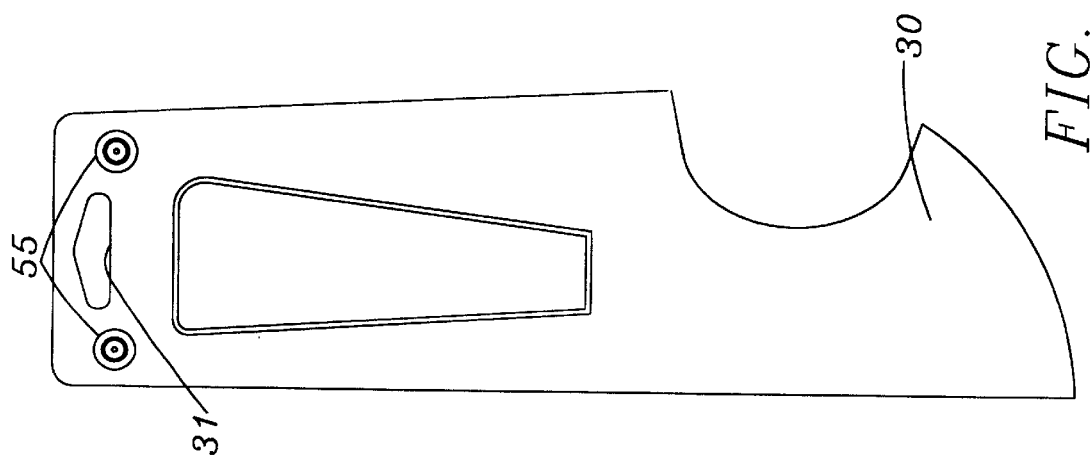
FIG. 18 is a front elevation view of a blister package/product support cards incorporating a pair of alignment fingers formed thereon for co-operating with a retaining clip of the present invention.

A further feature of the present invention that may be employed in order to further enhance the securement, retention, and display of blister package/product display cards is the incorporation of alignment means formed directly on each display card. As depicted in FIGS. 18–20, the preferred construction of the alignment means is in the form of two hollow, substantially cylindrical finger members 55 integrally formed on the surface of each display card 30, 34 and positioned on opposite sides of aperture 31. In addition, in the preferred construction, finger members 55 are formed with a tapering or narrowing outer wall construction, in order to enable the finger members 55 to be engageable with each other, as depicted in FIG. 20.

By employing the alignment means, either in the form of finger members 55 or in some other equally effective form, each card member 30 and 34 is securely retained in juxtaposed, space, aligned relationship with the adjacent card member 34. As a result, precise positioning of the card members for both shipment and display is achieved, as well as improving the ability of retaining clip members 20 to securely retain any desired quantity of display cards desired by the manufacturer.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by letters patent is:

1. A product retaining clip constructed for holding a plurality of product-bearing cards having a hook receiving aperture formed therein, said cards being in a stacked array having a first card, a last card, and at least one intermediate card, with the apertures of each card being substantially aligned with each other, for enabling the mounting of the cards on an elongated support hook or rod, said clip comprising:
   A. a handle portion for providing ease of access and use for said clip;
   B. a mounting portion extending from said handle portion and constructed for being telescopically inserted through and engageable in the aligned apertures of the plurality of stacked cards for supportingly retaining the plurality of stacked cards thereon, and defining an elongated open zone for enabling the passage of a support hook or rod therethrough;
   C. a first card engaging member constructed for contacting the first card; and
   D. a last card engaging member constructed for contacting the last card in the said stacked array, and cooperating with the first card engaging member and the mounting portion for securely holding and maintaining the cards in said stacked array with the intermediate card sandwiched between the first card and the last card in supported retained position on the mounting portion;
whereby said clip maintains the plurality of product bearing cards in a stacked array for ease and securement during shipping as well as for enabling the stacked array of cards to be easily placed on a support hook for display prior to sale.

2. The product retaining clip defined in claim 1, wherein said handle portion is further defined as comprising a substantially U-shaped housing member having upstanding arm members extending from a base portion with the arm members being arcuately movable relative to the base portion and the mounting portion comprising a pair of finger members extending from the distal end of the arm members of the U-shaped housing member with said finger members being in juxtaposed, spaced, facing relationship to each other, defining the elongated open zone therebetween.

3. The product retaining clip defined in claim 2, wherein each of said finger members comprises a card engaging ledge radially extending from the distal end thereof forming the first card engaging member, and said U-shaped housing member comprises a card engaging flange formed at the juncture with each of said finger members forming the last card engaging member, whereby the plurality of cards are securely retained on the pair of finger members between said ledge and said flange with the open zone enabling the mounting of the plurality of cards on a support hook/rod.

4. The product retaining clip defined in claim 1, wherein said handle portion comprises a substantially flat plate and said mounting portion comprises a pair of arm members extending from said plate in juxtaposed, spaced relationship and defining a support hook/rod receiving zone therebetween, said arm members being constructed for telescopic insertion, engagement, and removal from the aligned apertures of the stacked cards, and enabling the mounting of the stacked cards on a support hook or rod.

5. The product retaining clip defined in claim 4, wherein said first card engaging member and said last card engaging member are further defined as comprising notches formed in each arm member and positioned for receiving and securely holding a portion of the product bearing card adjacent the aperture thereof, whereby said plurality of cards are securely retained and held by said product retaining clip.

6. The product retaining clip defined in claim 1, wherein said clip is further defined as comprising a low-profile construction enabling the insertion of the clip into the aligned apertures of the stacked cards while also allowing an elongated hook for supporting the cards to be telescopically inserted therethrough for placement of the cards on said hook.

7. A product retaining clip constructed for holding a plurality of product-bearing cards having a hook receiving aperture formed therein, said cards being in a stacked array having a first card, a last card, and at least one intermediate card, with the apertures of each card being substantially aligned with each other, for enabling the mounting of the cards on an elongated support hook or rod, said clip comprising:
   A. a handle portion for providing ease of access and use for said clip and comprising a flat plate;
   B. a mounting portion extending from said handle portion and comprising an elongated housing dimensioned for insertion in the aperture of the stacked array of cards with holding means formed thereon for engaging and holding the cards in a stacked array;
   C. a first card engaging member constructed for contacting the first card; and
   D. a last card engaging member constructed for contacting the last card in the said stacked array, and cooperating with the first card engaging member and the mounting portion for securely holding and maintaining the cards in said stacked array with the intermediate card sandwiched between the first card and the last card in supported retained position in the mounting portion;
whereby said clip maintains the plurality of product bearing cards in a stacked array for ease and securement during shipping as well as for enabling the stacked array of cards to be easily placed on a support hook for display prior to sale.

8. The product retaining clip defined in claim 7, wherein said card engaging means comprises at least two flanges formed on opposed ends of said mounting portion for engaging the first card and the last card of the stacked array and securely holding and maintaining the cards in said stacked array.

9. The product retaining clip defined in claim 8, wherein said elongated housing is further defined as comprising a triangular shape.

10. The product retaining clip defined in claim 9, wherein said card engaging means is further defined as comprising a plurality of flanges extending from the triangular shaped housing with each of said flanges cooperating for separately holding and engaging each card in the stacked array.

11. A product retaining clip constructed for holding a plurality of product-bearing cards having a hook receiving aperture formed therein, said cards being in a stacked array defined by a first card, a last card, and at least one intermediate card, with said apertures aligned with each other, for enabling the mounting of the cards on an elongated support hook or rod, said clip comprising:

A. a handle portion for providing ease of access and use for said clip;

B. a pair of finger members extending from said handle portion and constructed for being telescopically inserted through and engageable in the aligned apertures of the plurality of stacked cards for supportingly retaining the plurality of stacked cards thereon, and defining an elongated open zone therebetween for enabling the passage of a support hook or rod therethrough;

C. a first card engaging and holding member constructed for contacting the first card; and D. a last card engaging member constructed for contacting the last card in the said stacked array, and cooperating with the first card engaging member and the mounting portion for securely holding and maintaining the cards in said stacked array with the intermediate card sandwiched between the first card and the last card in supported retained position on the mounting portion;

whereby said clip securely maintains the plurality of product bearing cards in a stacked array for ease and securement during shipping as well as for enabling the stacked array of cards to be easily placed on a support hook for display prior to sale.

12. The product retaining clip defined in claim 11, wherein said handle portion is further defined as comprising a substantially U-shaped housing member having upstanding arm members extending from a base portion with the arm members being arcuately movable relative to the base portion.

13. The product retaining clip defined in claim 12, wherein said pair of finger members are further defined as extending from the distal end of the arm members of the U-shaped housing member, with said finger members being in juxtaposed, spaced, axially parallel relationship to each other.

14. The product retaining clip defined in claim 13, wherein each of said finger members comprises a card engaging ledge extending from the distal end thereof.

15. The product retaining clip defined in claim 14, wherein said U-shaped housing member further comprises card engaging surfaces formed at the juncture with each of said finger members.

16. The product retaining clip defined in claim 15, wherein said card engaging surfaces comprise a substantially flat flange extending from the terminating end of said U-shaped housing portion with each of said flanges having a substantially flat surface positioned in facing relationship to the ledge extending from the distal end of each finger member.

17. The product retaining clip defined in claim 16, wherein said substantially flat surfaces of said flanges cooperate with the ledges of the finger members to form a holding zone within which the plurality of cards in the stacked array are securely held and maintained.

18. The product retaining clip defined in claim 11, wherein said clip is further defined as being constructed for enabling the telescopic entry of an elongated support hook through the aperture of each card for enabling the simultaneous mounting of the entire stacked array of cards on a support hook.

19. The product retaining clip defined in claim 18, wherein said clip is flexibly movable for enabling the quick and easy insertion and removal of the clip from the stacked array of cards.

* * * * *